Patented July 10, 1951

2,560,007

UNITED STATES PATENT OFFICE 2,560,007

APPARATUS FOR SECURING A HANDLE TO A CUP OR OTHER HOLLOW WARE ARTICLE MADE OF EARTHENWARE OR CHINA

Arthur Steele, Barlaston, England

Application January 30, 1948, Serial No. 5,258
In Great Britain October 20, 1943

7 Claims. (Cl. 25—22)

The present invention relates to apparatus for securing a handle to a cup or other hollow ware article made of earthenware, china, or any other ceramic body.

It has hitherto been customary in the pottery trade to secure a handle to a cup or other receptacle by moistening the handle with a suspension of clay in water, and then pressing the handle in position by hand. This is a somewhat delicate operation that can only be performed efficiently by a skilled operator.

Proposals have previously been made in which supports for the receptacles and the handles are displaced relatively to one another in order to bring a receptacle and a handle into contact with one another.

The object of the present invention is the provision of means whereby a handle can be affixed accurately and rapidly by an unskilled operative.

Means for carrying out this invention comprise supports for the article and a further support for the handle, mechanical means being provided whereby the supports can be displaced relatively to one another in order to bring the article and the handle into contact with one another, the supports for the article being caused to travel only in a circular path, whilst the support for a handle is caused to travel only in a rectilinear path.

Figure 1:
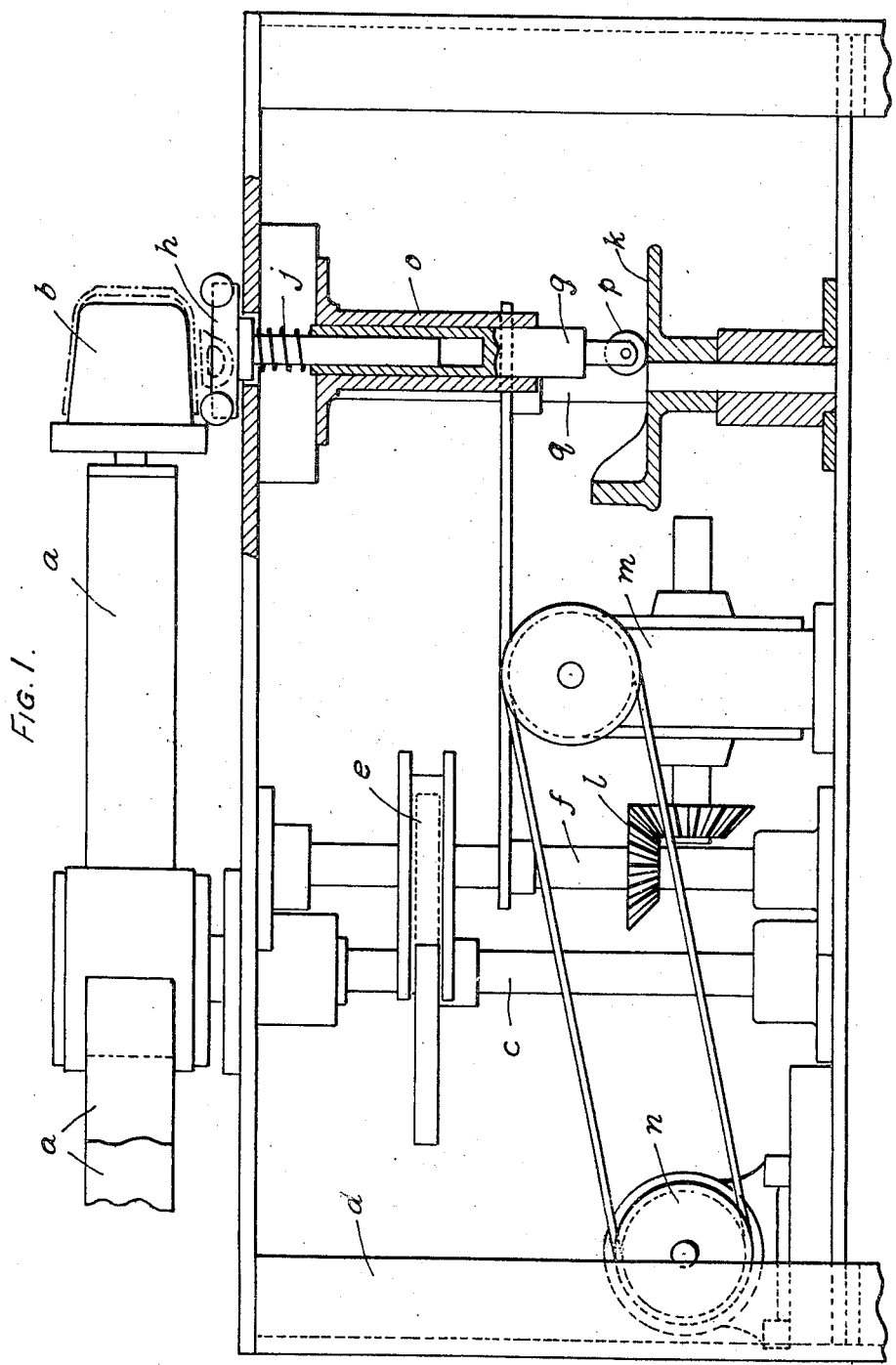
Figure 2:
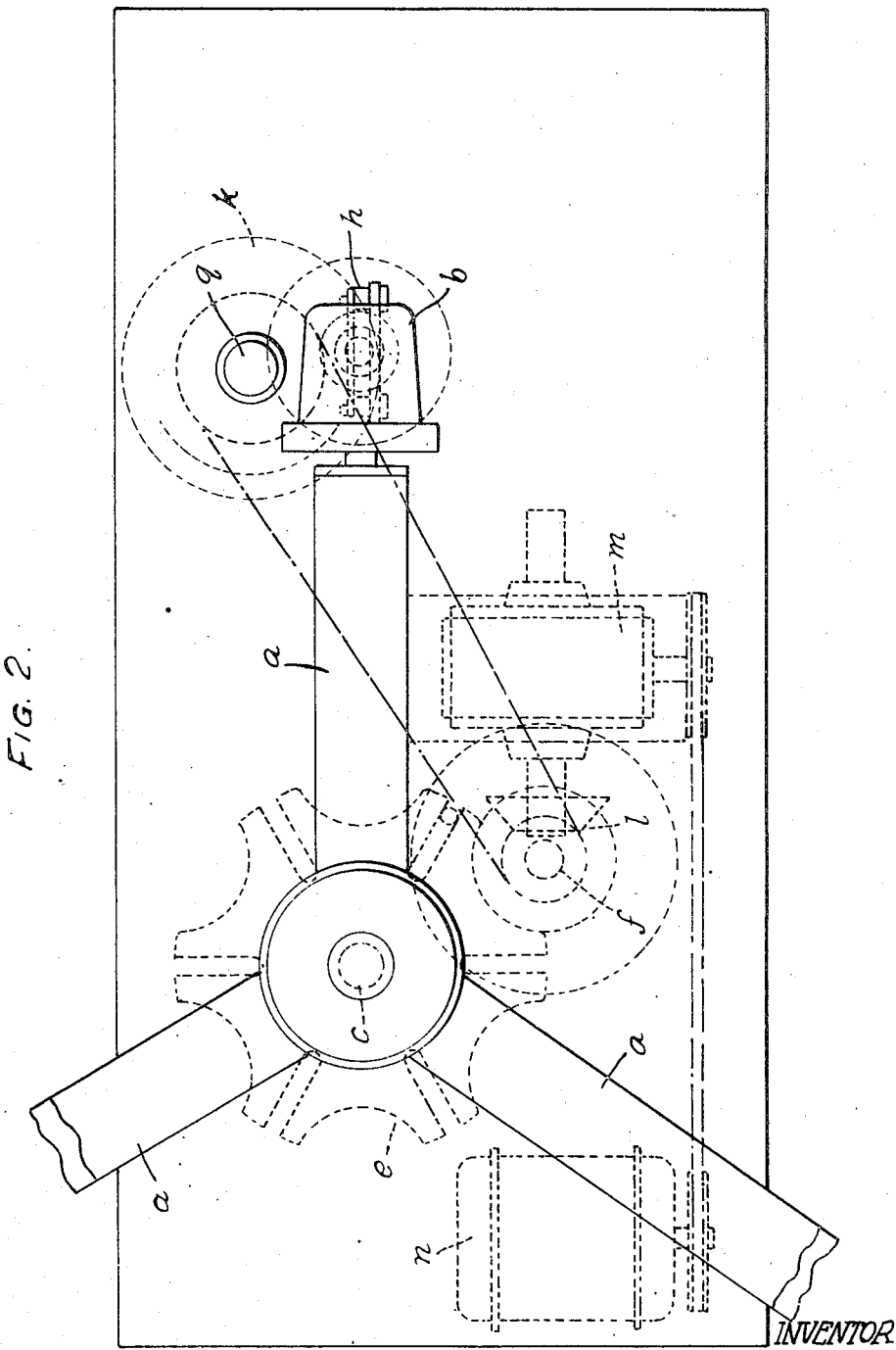
Figure 3:
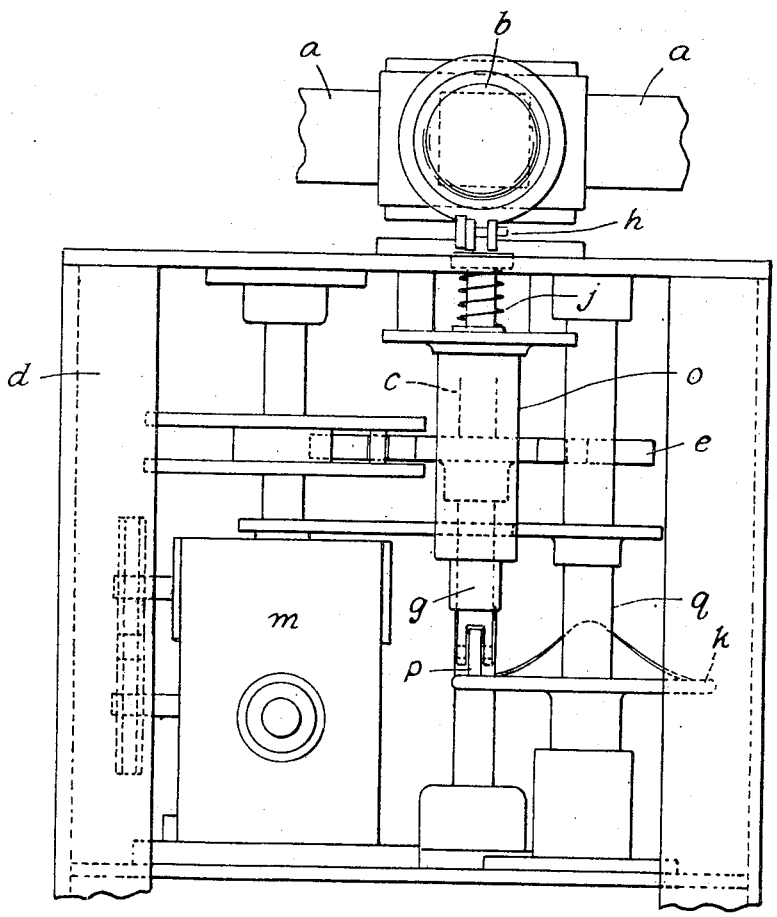

One form of construction of the invention is illustrated in the annexed drawings, in which Fig. 1 is a front elevation, Fig. 2 is plan, and Fig. 3 is an end elevation.

As shown in these drawings a plurality of rotatable arms $a$ carrying chums $b$ is secured radially to a shaft $c$ and is mounted on a suitable frame $d$. An intermittent angular movement of predetermined amount is imparted to these arms by means of a Geneva mechanism $e$, which is fixed on the shaft $c$ and a countershaft $f$ or by any other suitable means.

The frame $d$ also supports a ram $g$ which carries a handle holder $h$ under which is fixed a light compression spring $j$ and the said ram $g$ slides through a housing $o$, and has a roller bearing $p$ fixed on its lower end, and is operated in an upward and downward motion by means of a drum cam $k$.

The latter is fixed on a second countershaft $q$ which is driven from the first countershaft by means of a chain drive, or any other suitable means, which in turn is driven by mitre wheels $l$ and a reduction gear $m$ and electric motor $n$, the movement of the ram $g$ and the arms $a$ being synchronised.

The ram may also be operated by any other mechanical or electrical means.

The arrangement is such that the ram $g$ rises to a predetermined height when an arm $a$ carrying a cup on the chum $b$ comes to rest above the ram. When the latter is at its uppermost position the handle is brought into contact with the cup and the light compression spring then comes into operation, thus controlling the pressure required for fixing the handle.

The drum cam is designed to give the required time for upward and downward movement and a slight pause for the fixing of the handle.

The operations involved are:

1. Moistening of the handle.
2. Placing the handle in the handle holder.
3. Placing the cup or any other receptacle on the chum.

In another form of the appliance, the articles may be mounted on the ram and the handles mounted on the rotating arms. Therefore in this case the cup is brought into contact with the handle.

I claim:

1. An apparatus for securing a handle member to a cup member comprising radial arms having supports on the outer ends for one of said members, a shaft to which said radial arms are affixed, a frame for supporting said shaft for rotation, a Geneva mechanism for intermittently rotating said shaft and arms to bring the members successively past a securing station and there permitting the member to stop during the securing operation, a ram at the securing station having a movement intersecting the path of the outer portions of said arms, a holder on said ram for the other member, said ram comprising relatively movable upper and lower members, a spring interposed between said members for communicating movement from the lower to the upper member, a rotary cam at the securing station for engaging the lower end of the lower member of the ram, and means to drive said cam.

2. An apparatus as claimed in claim 1 characterized by the fact that said shaft is substantially vertical and the radial arms rotate in a substantially horizontal plane, and wherein the ram has a substantially vertical traverse.

3. An apparatus as claimed in claim 1 characterized by the fact that said means is so constructed and arranged to drive both the shaft and said cam in a timed relation whereby a radial arm is stopped at the securing station when the high point of the cam encounters said ram.

4. An apparatus as claimed in claim 1 characterized by the fact that the lower member of the ram is a hollow sleeve and the upper member of the ram has a shank axially slidable in said sleeve, the shank having an enlarged head on its upper portion with the spring coiled about the shank and having its terminal convolutions engaging respectively beneath said head and against the upper end of said sleeve.

5. An apparatus as claimed in claim 1 characterized by the fact that said means comprises an electric motor, a reduction gear driven by said motor, countershafts adjacent said first named shaft and said cam, and driving connections from said reduction gear to both said countershafts the lobe of the cam being in timed relationship to the Geneva mechanism to impart upward thrust to the ram when an arm is at rest at the securing station.

6. An apparatus for securing a handle member to a cup member comprising radial arms having supports on the outer ends for one of said members, a shaft to which said radial arms are affixed, a frame for supporting said shaft for rotation, a Geneva mechanism for intermittently rotating said shaft and arms to bring the members successively past a securing station and there permitting the member to stop during the securing operation, a ram at the securing station having a movement intersecting the path of the outer portions of said arms, a holder on said ram for the other member, said ram comprising relatively movable upper and lower members, a rotary cam at the securing station for engaging the lower end of the lower member of the ram for initially moving the lower member towards said upper member of the ram and subsequently into engagement with said upper member for moving said upper member, a light compression spring interposed between said upper and lower members adapted to be put under compression upon the initial movement of said lower member and to expand upon the termination of the movement of said lower member under the influence of said cam for imparting further movement in the same direction to said upper member, and means to drive said cam.

7. An apparatus for securing a handle member to a cup member comprising at least one radial arm having a support on its outer end for one of said members, a shaft to which said radial arm is affixed, a frame for supporting said shaft for rotation, mechanism for intermittently rotating said shaft and arm to bring the member thereon past a securing station and there permitting the member to stop during the securing operation, a ram at the securing station having a movement intersecting the path of the outer portion of said arm and comprising relatively movable upper and lower elements, a holder on one of said elements for the other member, means for actuating the other of said elements to bring the holder with its member therein in contact with the member on the arm, resilient means interposed between said elements for communicating movement from the said other element to the said one element, said mechanism and said actuating means being synchronized.

ARTHUR STEELE.

REFERENCES CITED

The following references are of record in the file of this patent:

UNITED STATES PATENTS

| Number | Name | Date |
|---|---|---|
| 1,226,795 | Newby | May 22, 1917 |
| 1,364,474 | Auperin | Jan. 4, 1921 |
| 1,469,584 | Case | Oct. 2, 1923 |
| 1,488,474 | Burns | Apr. 1, 1924 |
| 1,660,379 | Gray | Feb. 28, 1928 |
| 1,838,277 | Miller | Dec. 29, 1931 |
| 2,007,993 | Zahniser, Jr. et al. | July 16, 1935 |
| 2,011,490 | Kronquest | Aug. 13, 1935 |
| 2,034,925 | Slayter et al. | Mar. 24, 1936 |
| 2,244,291 | Eastus | June 3, 1941 |
| 2,349,739 | Louden et al. | May 23, 1944 |
| 2,361,517 | White et al. | Oct. 31, 1944 |